US008352739B2

(12) United States Patent
Park et al.

(10) Patent No.: US 8,352,739 B2
(45) Date of Patent: Jan. 8, 2013

(54) TWO-FACTOR AUTHENTICATED KEY EXCHANGE METHOD AND AUTHENTICATION METHOD USING THE SAME, AND RECORDING MEDIUM STORING PROGRAM INCLUDING THE SAME

(75) Inventors: Young-Man Park, Seoul (KR);
Seong-Choon Lee, Seoul (KR);
Yong-Joo Tcha, Seongnam (KR)

(73) Assignee: KT Corporation, Seongnam, Kyungki-Do (KR)

( * ) Notice: Subject to any disclaimer, the term of this patent is extended or adjusted under 35 U.S.C. 154(b) by 1425 days.

(21) Appl. No.: 10/562,605

(22) PCT Filed: Jun. 28, 2004

(86) PCT No.: PCT/KR2004/001569
§ 371 (c)(1),
(2), (4) Date: Aug. 25, 2006

(87) PCT Pub. No.: WO2005/002131
PCT Pub. Date: Jan. 6, 2005

(65) Prior Publication Data
US 2010/0325435 A1 Dec. 23, 2010

(30) Foreign Application Priority Data

Jun. 27, 2003 (KR) .................. 10-2003-0042611

(51) Int. Cl.
*H04L 29/06* (2006.01)
(52) U.S. Cl. ...................................... 713/169; 380/247
(58) Field of Classification Search .................. 713/168, 713/169, 171; 380/277, 270, 247, 271; 726/16
See application file for complete search history.

(56) References Cited

U.S. PATENT DOCUMENTS

| 5,325,433 | A | * | 6/1994 | Torii et al. | .................. | 380/30 |
| 5,434,918 | A | | 7/1995 | Kung et al. | .................. | 380/25 |
| 5,784,463 | A | * | 7/1998 | Chen et al. | .................. | 713/171 |

(Continued)

FOREIGN PATENT DOCUMENTS

CN 1256599 A 6/2010

(Continued)

OTHER PUBLICATIONS

Japanese Office Action issued in a corresponding Japanese Patent Application No. 2006-516955 and mailed on Aug. 17, 2010.

(Continued)

*Primary Examiner* — Ali Abyaneh
(74) *Attorney, Agent, or Firm* — Ladas & Parry, LLP

(57) ABSTRACT

A two-factor authenticated key exchange method. A subscriber station transmits a value generated by using an identifier and an authentication server's public key to the authentication server through an access point. The authentication server uses the value to detect the subscriber's password, a key stored in a token, and the authentication server's secret key, generate a random number. The subscriber station uses the random number, password, and the key to transmit an encrypted value and the subscriber's authenticator to the authentication server. The authentication server establishes a second value generated by using the password, key, and random number to be a decrypted key to decrypt the encrypted value, authenticate the subscriber's authenticator, and transmits the authentication server's authenticator to the subscriber station. The subscriber station authenticates the authentication server's authenticator by using the key and password.

13 Claims, 2 Drawing Sheets

U.S. PATENT DOCUMENTS

| | | | |
|---|---|---|---|
| 6,088,799 A | 7/2000 | Morgan et al. | 713/182 |
| 6,996,714 B1 * | 2/2006 | Halasz et al. | 713/163 |
| 2002/0078346 A1 | 6/2002 | Sandhu et al. | 713/156 |
| 2002/0159601 A1 | 10/2002 | Bushmitch et al. | 380/277 |
| 2002/0194478 A1 * | 12/2002 | MacKenzie | 713/171 |
| 2003/0037241 A1 | 2/2003 | Campagna | 713/170 |
| 2003/0093680 A1 | 5/2003 | Astley et al. | 713/183 |

FOREIGN PATENT DOCUMENTS

| | | |
|---|---|---|
| EP | 1001570 A2 | 5/2010 |
| JP | 2001-060947 A | 3/2001 |
| JP | 2001-313634 A | 11/2001 |
| JP | 2002-521962 A | 7/2002 |
| JP | 2005-509938 A | 4/2005 |
| WO | 98/45975 | 10/1998 |
| WO | 03/025771 A1 | 3/2003 |

OTHER PUBLICATIONS

Samfat, Didier, et al. "A Method Providing Identity Privacy to Mobile Users during Authentication", First Workshop on Mobile Computing Systems and Applications, France, 1994, pp. 196-199.

* cited by examiner

TWO-FACTOR AUTHENTICATED KEY EXCHANGE METHOD AND AUTHENTICATION METHOD USING THE SAME, AND RECORDING MEDIUM STORING PROGRAM INCLUDING THE SAME

TECHNICAL FIELD

The present invention relates to an AKE (authentication and key establishment) protocol. More specifically, the present invention relates to a TAKE (two-factor authenticated key exchange) method in services such as the Internet, wireless LANs, and public access wireless LANs, a security method for authenticating entity and establishing a key using the same, and a recording medium storing a program including the same.

BACKGROUND ART

Conventional authentication and key establishment methods includes the TLS (transport layer security) method which uses certificates, the SRP (secure remote password) method and the EAP (extensible authentication protocol)-MD5 method which use passwords, and the PEAP (protected EAP) method and the EAP-TTLS (tunneled TLS) which use both certificates and passwords, and these methods respectively have advantages and disadvantages. That is, the TLS methods needs a PKI (public key infrastructure) which is complicated and spends a large cost, and a certificate management system, the SRP method requires a large amount of exponentiation from a user terminal and is weak against 2-for-1 guess attacks. Also, the PEAP and EAP-TTLS methods are weak against the MitM (man-in-the-middle) attacks and have a great number of times on exchanged messages, and the EAP-MD5 has a disadvantage of providing no mutual authentication and session key.

In particular, it is not easy to find an 802.1x EAP authentication method which is secure and effective in the case of using PDAs (personal digital assistants) on the (public access) wireless LAN because the PDAs need a long time and consumes much power when performing complicated operations such as exponentiation and inverse element computation.

General authentication factors include (1) a factor which a user memorizes (e.g., passwords) and (2) a factor which the user possesses (e.g., a token or a mobile device).

A single-factor authentication method using the password of item (1) is not secure because of following problems. First, when the user inputs the password, another person behind the user may cheat it, and the password may be exposed through keystroke monitoring. Second, the password may be exposed to the attackers through social engineering such as tricks and threats. Third, the password is weak against dictionary attacks since it has a low entropy with respect to the amount of information. Fourth, the password may be exposed because of the user's bad habits such as writing the password on a paper or using it to many places without updating it. In particular, the public access wireless LAN service for attempting network accesses in the hot spot area is more dangerous to the attacks because the attackers may acquire the passwords off line through the keystroke monitoring or social engineering even though the EAP-SRP, PEAP, and EAP-TTLS methods for authenticating the users through the passwords are secure protocols against the dictionary attacks.

Further, the single-factor authentication method using the token or the mobile device requires a token and an input device (e.g., a card reader) for reading the token. The token which is the second factor includes mobile devices such as a smart card, a USB (universal serial bus) key, and PDAs. Therefore, the usage of the USB key for the token in the radio environment requires not much cost since no further hardware is needed to be added. In this instance, the token is to be stored in a security module with a temper resistant characteristic since the token has secret information on a symmetric key or personal authentication.

Accordingly, the Internet or the (public access) wireless LAN requires a better authentication system than the authentication executed by the above-noted authentication components, and in particular, the authentication methods for solving subsequent technical requirements are needed.

(1) Identity protection: It is necessary to protect identities of clients from passive attacks such as wiretap for the purpose of privacy. In particular, the protection is useful for the user who receives an IP address through the DHCP (dynamic host configuration protocol).

(2) Powerful mutual authentication: Mutual authentication between a subscriber and a network is needed since the attackers can perform an MitM attack while they are located between the subscriber and an authentication server.

(3) Session key establishment: A session key is to be established in order to protect data communicated between the subscriber and the network.

(4) FS (forward secrecy): An FS which is a property of preventing the attackers from calculating past session keys from the previous wiretapped session when a long term secret keying material of an object which participates in a protocol is exposed, is to be provided. The FS is classified as a half FS and a full FS. The former one represents that the attacker cannot induce the past session key when a secret key of one of the objects which include the subscriber and the authentication server is exposed, and the latter one denotes that the session key is secure when the secret keys of the two objects are exposed.

(5) Security on offline dictionary attacks: The protocol is to be designed such that the attacker may not obtain secret information shared by the subscriber and the server when the attacker attacks the offline dictionary to try to acquire the secret information.

(6) Security on MitM attacks: The (public access) wireless LAN must be designed to be secure against the MitM attacks using the rouge AP (access point) or the rouge wireless NIC.

(7) Security on replay attacks: It is needed to prevent the attackers from retransmitting used messages and succeeding in authentication and key establishment.

(8) Efficiency:
  Minimize operation loads: It is needed to require a less amount of operation applicable to the PDAs in the (public access) wireless LAN. The load of online computation is to be minimized by using pre-computation.
  Minimize the number of times on message exchanges: It is more advantageous as the number of communication rounds becomes lesser in consideration of efficiency of network resources and delay on the network. Therefore, the number of times on the messages to be exchanged between the subscriber and the authentication server is to be less.
  Minimize the usage of communication bandwidths: Sizes of protocol messages are to be small.

(9) Key confirmation: The legal user who participates in the protocol is to be confirmed that he shares a common secret session key with a desired peer.

(10) Non-repudiation: A non-repudiation function for preventing the user from repudiating billing data such as a service used time and a number of times on network accesses.

DISCLOSURE

Technical Problem

It is an advantage of the present invention to provide a TAKE method for authenticating subscribers by using keys stored in the password and token which are two independent authentication factors, an authentication method using the same, and a recording medium storing a program including the same.

Technical Solution

In one aspect of the present invention, in a key exchange method for mutual authentication at a subscriber station accessed to an authentication server through a wired/wireless communication, a two-factor authenticated key exchange method comprises: (a) the subscriber station transmitting a key to the authentication server, the key being generated using an identifier of the subscriber station and a public key of the authentication server; (b) the subscriber station receiving a random number generated by the authentication server; (c) using the received random number, a password predefined in the subscriber station, and a key stored in a token, and transmitting an encrypted first specific value and a generated authenticator of the subscriber to the authentication server; (d) the subscriber station receiving an authenticator of the authentication server according to an authentication success on the transmitted authenticator of the subscriber by the authentication server; and (e) the subscriber station using the secret key and the password, authenticating the received authenticator of the authentication server, and receiving the authenticator of the authentication server when the authentication is successful.

The two-factor authenticated key exchange method further comprises: before (a), the subscriber station determining the symmetric key and the password used for a symmetric key algorithm and sharing the symmetric key and the password with the authentication server during a registration process; and the subscriber station generating a random number and precomputing the first predetermined value when the subscriber station does not exchange a key for authentication with the authentication server.

The subscriber station stores the password and the public key of the authentication server in the token.

The generated key is generated by applying a one-way Hash function to an identifier of the subscriber station and the public key of the authentication server in (a).

The (c) comprises: applying the Hash function to the received random number, the password, and the key stored in the token, and generating a second predetermined value; using the second predetermined value and encrypting the first predetermined value; using the random number and the first predetermined value, and generating the subscriber's session key; applying the Hash function to the generated session key, the password, the key stored in the token, and the identifier of the subscriber station, and generating the subscriber's authenticator; and transmitting the encrypted first predetermined value and the subscriber's authenticator to the authentication server.

The (e) comprises: applying the Hash function to the subscriber's session key, the password, the key stored in the token, and the public key of the authentication server, and generating a third predetermined value; determining whether the generated third predetermined value corresponds to the authenticator of the authentication server received from the authentication server; and determining that the authentication between the subscriber station and the authentication server is successful and receiving the authenticator of the authentication server when the generated third predetermined value is found to correspond to the authenticator of the authentication server.

In another aspect of the present invention, in a method for an authentication server accessed to a subscriber station for wired/wireless communication to exchange a key for mutual authentication, a two-factor authenticated key exchange method comprises: (a) the authentication server receiving a key which is generated by the subscriber station by using an identifier and a public key of the authentication server; (b) the authentication server using the value received from the subscriber station, detecting the subscriber's password, the key stored in a token, and a public key of the authentication server, generating a random number, and transmitting the random number to the subscriber station; (c) the authentication server receiving an encrypted value generated by the subscriber station and the subscriber's authenticator based on the transmitted random number; (d) the authentication server establishing a first predetermined value generated by using the password, the key stored in the token, and the random number to be a secret key, decrypting the encrypted value received in (c) to generate a second predetermined value, authenticating the received authenticator of the subscriber based on the second predetermined value, and receiving the subscriber's authenticator when the authentication is successful; and (e) the authentication server using the password, the key stored in the token, and the public key, and transmitting the authenticator of the authentication server to the subscriber station.

The two-factor authenticated key exchange method further comprises: before (a), the authentication server determining the symmetric key and the password used for a symmetric key cryptosystem and sharing the symmetric key and the password with the subscriber station during a registration process.

The authentication server stores the key stored in the token, the password, and the secret key of the authentication server in a security file database.

The (d) comprises: applying the Hash function to the password, the key stored in the token, and the random number, and generating the first predetermined value; establishing the generated first predetermined value to be a secret key, decrypting the received encrypted value, and generating the second predetermined value; using the generated second predetermined value, the public key of the authentication server, and the random number, and generating a session key of the authentication server; determining whether the value obtained by applying the Hash function to the generated session key, the password, the key stored in the token, and an identifier of the subscriber station corresponds to the received authenticator of the subscriber; and determining that the authentication for the subscriber is found to be successful and receiving the authenticator of the subscriber when the value corresponds to the received authenticator of the subscriber.

The session key of the authentication server is used to generate the authenticator of the authentication server in (e).

The subscriber station transmits a user name, a hashed value of the public key of the authentication server, and a domain name to the authentication server when the identifier of the subscriber station uses the NAI (network access ID) format in order to support global roaming and billing in (a).

In still another aspect of the present invention, in a mutual authentication method through a two-factor authenticated key exchange between a subscriber station and an authentication server in a wireless communication system in which the subscriber station and the authentication server are accessed through an access point, an authentication method through a two-factor authenticated key exchange comprises: (a) the subscriber station receiving an identifier request from the access point; (b) the subscriber station transmitting a key which is generated by using an identifier of the subscriber station and a public key of the authentication server to the authentication server through the access point; (c) the authentication server using the key received from the subscriber station, detecting the subscriber's password, the secret key, and the public key of the authentication server, generating a random number, and transmitting the random number to the subscriber station through the access point; (d) the subscriber station using the received random number, the password, and the key stored in the token, and transmitting an encrypted first predetermined value and the generated authenticator of the subscriber to the authentication server through the access point; (e) the authentication server establishing a second predetermined value generated by using the password, the key stored in the token, and the random number to be a secret key, decrypting the encrypted value received in (d), authenticating the received authenticator of the subscriber based on the decrypted value, and when the authentication is found successful, transmitting an authenticator of the authentication server generated by using the password, the key stored in the token, and the public key to the subscriber station through the access point; (f) the subscriber station using the key stored in the token and the password, authenticating the received authenticator of the authentication server, and transmitting an authentication result to the authentication server through the access point; and (g) the authentication server transmitting an access permission for the subscriber to the subscriber station through the access point when the authentication result transmitted from the subscriber station is found successful.

The key stored in the token is a symmetric key.

An extensible authentication protocol is used between the subscriber station and the access point, and a RADIUS protocol is used between the access point and the authentication server.

DESCRIPTION OF DRAWINGS

The accompanying drawings, which are incorporated in and constitute a part of the specification, illustrate an embodiment of the invention, and, together with the description, serve to explain the principles of the invention.

BEST MODE

Figure 1:
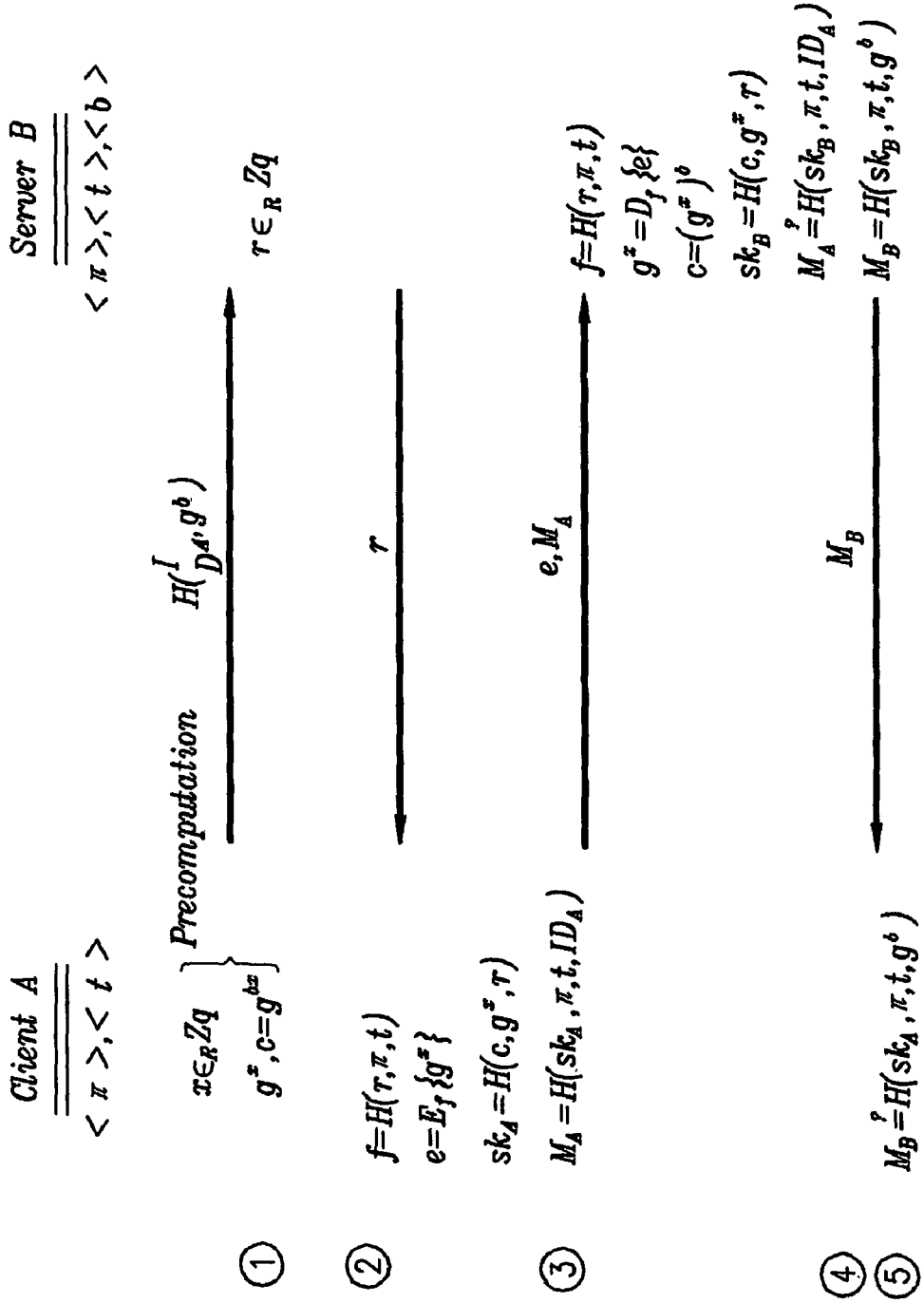
FIG. 1 shows a flowchart of a TAKE protocol according to a preferred embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

An authentication method using the TAKE protocol according to a preferred embodiment of the present invention will be described.

FIG. 1 shows a flowchart of a TAKE protocol according to a preferred embodiment of the present invention.

Symbols described in the preferred embodiment are defined below.

A: subscriber (supplicant or client)
B: authentication server
$\pi$: password
t: symmetric key used for symmetric key encryption
$ID_A$: identifier of the subscriber A
$E_K\{\}$ and $D_K\{\}$: Encryption and decryption with symmetric key K
H( ): One-way Hash function
$sk_A$: session key generated by A
p: large prime number
q: a large prime number for dividing (p−1)
g: generator which is an element of $Z^*_p$ with the order of q, and
b, $g^b$(mod p): static secret key and public key of authentication server B Referring to FIG. 1, an operation of the TAKE protocol according to the preferred embodiment of the present invention includes an enrollment stage, a precomputation stage, and a performance stage.

The enrollment stage will now be described.

A subscriber Client A which is substantially the client's mobile terminal and the server B determine the symmetric key t and the password $\pi$ used for the symmetric key cryptosystem such as the 3DES (data encryption standard) or the Rijndael, and share them. The server selects a number <b> within the range of the secret key [1~q−1] of the server for a specific client, stores the number in a secure database DB, and notifies the client of the server's public key $g^b$ and domain parameters p, q, and g. The client stores the symmetric key in a token. The server's public key $g^b$ and domain parameters p, q, and g are not necessary to be stored in a secure place since they are public information.

The precomputation stage will now be described.

The precomputation stage is performed on line before the protocol is performed, and in detail, it reduces time and computation used during the performance of the protocol.

The client's mobile terminal performs precomputation in the case of an idle time at which no mobile network is used or when the terminal is turned on. As shown in FIG. 1, the client A selects a random number x within the range of [1~q−1]. That is, the client selects the random number $x \in_R Z_q$, and precomputes $g^x$ and $g^{bx}=c$ (mode p hereinafter) by using the random number x.

The performance stage will now be described, which performs mutual object authentication and session key establishment as follows.

(1) The client A transmits $H(ID_A, g^b)$ which is a hashed value of the client's identifier $ID_A$ and the authentication server's public key $g^b$ in order to access the Internet or the (public access) wireless LAN.

When the client ID uses the NAI (network access ID) format in order to support global roaming and billing, for example, when the client ID is given to be userid@realm.com, H(userid, $g^b$) which is a hashed value of the user name and $g^b$, and the realm name are transmitted.

(2) The authentication server B receives $H(ID_A, g^b)$ and detects <$H(ID_A, g^b)$>, <$ID_A$>, <$\pi$>, <t>, and <b> from a client security file database DB. The authentication server B selects a random number $r \in_R Z_q$ within the range of [1~q−1], and transmits the number to the client A.

(3) The client A receives the number r from the authentication server B, computes the hashed value of $f=H(r, \pi, t)$ by using the values of π and t, computes $e=E_f\{g^x\}$ by using the value of f as a symmetric key for performing symmetric key encryption on the value of $g^x$, computes a session key of $sk_A=H(c, g^x, r)$ which is a hashed value of c, $g^x$, and r, and generates an authenticator of $MA=H(sk_A, \pi, t, ID_A)$ which is a hashed value of π, t, and $ID_A$. The client A transmits the generated e and $M_A$ to the authentication server B.

(4) The authentication server B receives e and $M_A$ from the client A, computes $f=H(r, \pi, t)$ by using r, π, and t, decrypts the received e by using the computed secret key of f, and finds $g^x=D_f\{e\}$.

The authentication server B computes $c=g^{xb}$ by using the found $g^x$ and b, computes $sk_B=H(c, g^x, r)$ by using c and r, generates $H(sk_B, \pi, t, ID_A)$, and checks whether $H(sk_B, \pi, t, ID_A)$ corresponds to the received $M_A$. When the two values correspond to each other, the authentication on the client A is found successful, and the authentication server B receives the $M_A$ transmitted by the client A, computes $M_B=H(sk_B, \pi, t, g^b)$, and transmits the computed $M_B$ to the client A.

(5) The client A checks whether $M_B$ received from the authentication server B corresponds to $H(sk_B, \pi, t, g^b)$ computed by the client A. When the two values correspond to each other, the authentication on the authentication server B is found successful, and the client A receives $M_B$. When the client A and the authentication server B receive $M_A$ and $M_B$ respectively, mutual authentication between the client A and the authentication server B is found successful.

Figure 2:
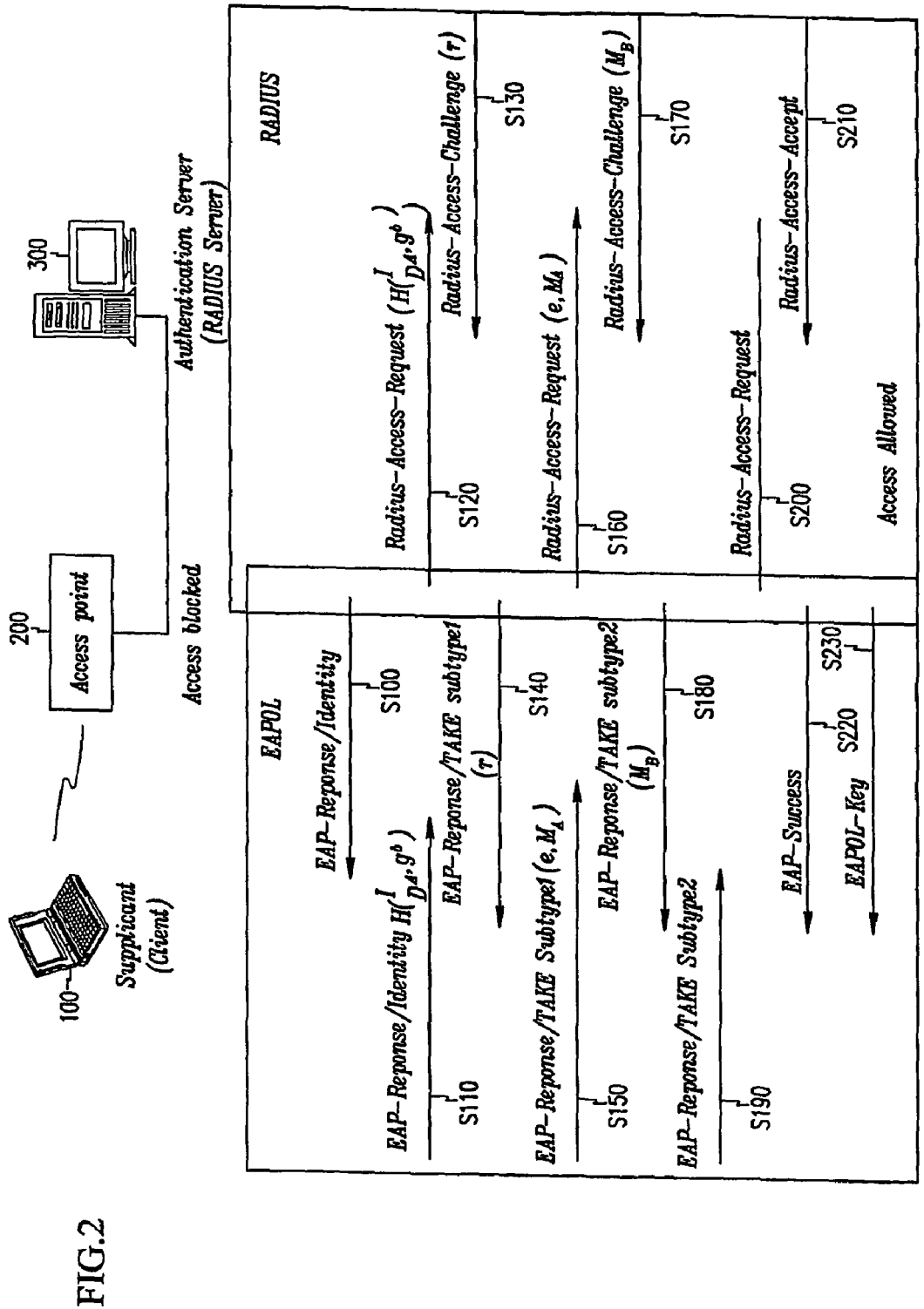
FIG. 2 shows an authentication and key exchange flowchart in a public access wireless LAN using the TAKE protocol according to a preferred embodiment of the present invention.

FIG. 2 shows an authentication and key exchange flowchart in a public access wireless LAN using the TAKE protocol according to a preferred embodiment of the present invention.

Referring to FIG. 2, a subscriber (a supplicant or a client) 100 and an authentication server (or a RADIUS server) 300 are connected each other through an access point 200 such as a (public access) wireless LAN, and the subscriber 100 is authenticated by the authentication server 300.

In this instance, an EAP (extensible authentication protocol) is used between the subscriber 100 and the access point 200, and a RADIUS protocol is used between the access point 200 and the authentication server 300.

Also, the subscriber 100 stores a symmetric key t, a password π, a public key $g^b$ of the authentication server 300, DH (Diffie-Hellman) domain parameters p, q, and g, and the authentication server 300 stores a server secret key b in addition to a symmetric key t, a password π, a public key $g^b$ of the authentication server 300, DH (Diffie-Hellman) domain parameters p, q, and g.

When the subscriber 100 requests an access service to the (public access) wireless LAN, the access point 200 transmits an EAP-request identity with identity 1 to the subscriber 100 in step S100.

The subscriber 100 transmits an EAP-response/identity $H(ID_A, g^b)$ which defines the hashed value $H(ID_A, g^b)$ of the identifier $ID_A$ of the subscriber and the public key $g^b$ of the authentication server 300 as an identity to the access point 200 in step S110.

The access point 200 transmits an radius-access-request $H(ID_A, g^b)$ on the authentication server 300 including the identity transmitted from the subscriber 100 in step S120.

The authentication server 300 detects $<ID_A>$, $<\pi>$, $<t>$, and $<b>$ from the corresponding database based on $H(ID_A, g^b)$ transmitted from the access point 200, selects a random value $r \in_R Z_q$, and transmits the value as a radius-access-challenge value to the access point 200 in step S130, and the access point 200 defines the value of r as TAKE subtype 1, and transmits an EAP-request TAKE subtype1(r) to the subscriber 100 in step S140.

The subscriber 100 receives the random value of r from the authentication server 300, computes the hashed value of $f=H(r, \pi, t)$ by using π and t, computes $e=E_f\{g^x\}$ by using the value of f as a secret key for encrypting the symmetric key, computes a session key $sk_A=H(c, g^x, r)$ which is a hashed value of c, $g^x$, and r, generates an authenticator $M_A=H(sk_A, \pi, t, ID_A)$ which is a hashed value of π, t, and $ID_A$, and transmits an EAP-response/TAKE subtype1 (e, $M_A$) on e and $M_A$ in the TAKE subtype1 to the access point 200 in step S150, and the access point 200 transmits a radius-access-request (e, $M_A$) including (e, $M_A$) transmitted from the subscriber 100 to the authentication server 300 in step S160.

The authentication server 300 receives e and $M_A$ from the subscriber 100, computes a hashed value of $f=H(r, \pi, t)$ by using r, π and t, decrypts the received e with the computed secret key of f, finds $g^x=D_f\{e\}$, computes $c=g^{xb}$ by using the found $g^x$ and b, computes $sk_B=H(c, g^x, r)$ by using c and r, generates $H(sk_B, \pi, t, ID_A)$, and checks whether $H(sk_B, \pi, t, ID_A)$ corresponds to the received $M_A$. When they correspond to each other, the authentication on the subscriber 100 is found successful, and the authentication server 300 receives $M_A$ from the subscriber 100, computes $MB=H(sk_B, \pi, t, g^b)$, and transmits $M_B$ as a radius-access-challenge ($M_B$) to the access point 200 in step S170.

The access point 200 defines the $M_B$ transmitted from the authentication server 300 as a TAKE subtype2, and transmits an EAP-request TAKE subtype2($M_B$) to the subscriber 100 in step S180.

The subscriber 100 receives $M_B$ from the authentication server 300, and checks whether the $M_B$ corresponds to $H(sk_B, \pi, t, g^b)$ computed by the subscriber 100. When they correspond to each other, the authentication on the authentication server 300 is found successful, and the subscriber 100 receives the $M_B$. When the subscriber 100 and the authentication server 300 receive the $M_A$ and the $M_B$ respectively, the mutual authentication between the subscriber 100 and the authentication server 300 is found successful.

The subscriber 100 transmits an EAP-response/TAKE subtype2 on the TAKE subtype2 which represents acknowledgment to the access point 200 in step S190, and the access point 200 transmits a radius-access-request including the message transmitted from the subscriber 100 to the authentication server 300 in step S200.

When the authentication result transmitted from the subscriber through the access point 200 is successful, the authentication server 300 transmits a radius-access-accept message to the access point 200 in step S210, and the access point 200 transmits an EAP-success message to the subscriber 100 according to the result in step S220, and transmits an EAPOL (EAP encapsulation over LAN protocol)-key message to the subscriber 100 in order to notify the subscriber 100 that the access is allowed in step S230.

In this instance, the messages or packets transmitted between the subscriber 100 and the access point 200 include the EAPOL.

It will now be described whether the TAKE protocol using authentication method satisfies technical conditions required for powerful authentication. Security analysis on the TAKE protocol using authentication method according to the preferred embodiment of the present invention is given below.

(1) Identity protection: When receiving an ID request, the subscriber transmits $H(ID_A, g^b)$ instead of the subscriber's $ID_A$ so that passive attackers such as wiretappers may not know the subscriber's identity. Here, the authentication server is to match the subscriber's anonymity with the subscriber's real identity.

(2) Powerful mutual authentication: The subscriber can lead an authenticator MA and acquire authentication when he knows the password π, the secret key t, and the authentication server's public key $g^b$. The authentication server can lean an MB and obtain network authentication when it knows the password π, the secret key t, the subscriber $ID_A$, and the server's secret key b. Thus, powerful mutual authentication is allowed.

(3) Session key establishment: Session keys $sk_A$ and $sk_B$ are generated to protect data between the subscriber and the authentication server. The generated session keys provide randomness and freshness which are caused by selection of dynamic numbers x and r of the respective objects.

(4) FS (forward secrecy): When secret information <IDA>, <π>, <t>, and <$g^b$> possessed by the subscriber is exposed to the attacker, he can decrypt the e ciphertext to know $g^x$, but it is difficult to compute the value of $c=g^{xb}$ because of the DLP (discrete logarithm problem). Further, when the secret key <b> of the server is exposed, the attacker must know the $g^x$ in order to compute the value of $c=g^{xb}$, and must know <π> and <t> in order to know $g^x$. That is, the attacker can compute the session keys when he knows <b>, <π>, and <t>. However, since the service providers are big companies and are deemed to have their own excellent security systems in the actual (public access) wireless LAN environment, the probability in which important secret information relating to security is revealed to the attackers seems very low. Therefore, the TAKE protocol is not a general half FS but a practical half FS in the (public access) wireless LAN.

(5) Offline dictionary attacks: The attackers may attempt attacking the offline dictionary in order to acquire secret information for successful authentication. The passwords with low entropy may be weak against the attack, but this kind of attack is substantially impossible since the secret key and the password with high entropy stored in the token are used as keys for encrypting the random value of $g^x$ in the TAKE. That is, the attacker must presume the password, the secret key, and the random value of $g^x$.

(6) Security on the MitM attacks: The attackers can be located between the subscriber and the server to perform the MitM attack, but this attack is very difficult to succeed since the TAKE uses the powerful two-factor authentication.

(7) Security on the replay attacks: The replay attack represents an attack method for the attacker to retransmit the used message and reestablish the previous session key. The TAKE is secure against the replay attacks since the subscriber and the server respectively generate the random numbers x and r for each session to generate session keys.

(8) Efficiency
  Minimize operation loads: The DH (Diffie-Hellman) protocol is frequently used for the AKE protocol since it provides the FS, but it requires exponentiation computation and generates a large amount of computation. Most operation time is used for exponentiation, computation of inverse elements, and multiplication. In particular, the PDAs use much real-time authentication time when the amount of calculation is increased. Therefore, the TAKE method is designed to allow the subscriber to use one symmetric key encryption and five hash functions on line, and perform exponentiation computation twice for the precomputation off line. The server needs amounts of computation on one exponentiation, one symmetric key decryption, and four hash functions.
  Minimize the number of times on message exchanges: Since the TAKE has four passes, the number of messages to be exchanged between the subscriber and the authentication server is less.
  Minimize the usage of communication bandwidths: Three of from among five messages represent an output bit number of Hash functions, one thereof is a bit number of a random number, and the last one thereof is an output bit number of the ciphertext of $g^x$.

(9) Key confirmation: The TAKE includes session keys in the authenticators MA and MB and performs key confirmation to thus check that the legal subscriber who participated in the protocol shares the common secret session key with the desired authentication server.

(10) Non-repudiation: The TAKE does not use digital signatures but uses powerful two-factor authentication, and hence, it is prevented for deceitful users to use the service and deny the usage of service.

The preferred embodiment of the present invention described above can be realized in a program, and stored into computer-readable recording media (CD-ROMs, RAMs, floppy disks, HDDs, and optical discs.)

While this invention has been described in connection with what is presently considered to be the most practical and preferred embodiment, it is to be understood that the invention is not limited to the disclosed embodiments, but, on the contrary, is intended to cover various modifications an equivalent arrangements included within the spirit and scope of the appended claims.

The invention claimed is:

1. In a key exchange method for mutual authentication at a subscriber station accessed to an authentication server through a wired/wireless communication, a two-factor authenticated key exchange method comprising:
  (a) the subscriber station during an idle time at which the subscriber station is not connected to the authentication server and before a protocol for authentication with the authentication server is performed generating a random number and precomputing a first predetermined value to use for authentication with the authentication server;
  (b) the subscriber station transmitting a key to the authentication server, the key being generated using an identifier of the subscriber station and a public key of the authentication server;
  (c) the subscriber station receiving a random number generated by the authentication server;
  (d) the subscriber station encrypting the first predetermined value using the received random number, a password predefined in the subscriber station, and a key stored in a token, and transmitting the encrypted first predetermined value and a generated authenticator of the subscriber to the authentication server;
  (e) the subscriber station receiving an authentication server's authenticator from the authentication server, wherein the authentication server authenticates the generated authenticator of the subscriber using the encrypted first predetermined value and generates the authentication server's authenticator when the authentication is successful; and
  (f) the subscriber station using a secret key and the password, authenticating the received authentication server's authenticator, and accepting the authentication server's authenticator when the authentication is successful, wherein the authentication server's authenticator is generated by the authentication server using the encrypted first predetermined value transmitted from the subscriber station, and wherein the subscriber station authenticates the authentication server's authenticator using the first predetermined value.

2. The two-factor authenticated key exchange method of claim 1, wherein the key stored in the token is a symmetric key.

3. The two-factor authenticated key exchange method of claim 2, further comprising: before (a),
the subscriber station determining the symmetric key and the password used for a symmetric key algorithm and sharing the symmetric key and the password with the authentication server during a registration process.

4. The two-factor authenticated key exchange method of claim 1, wherein the subscriber station stores the password and the public key of the authentication server in the token.

5. The two-factor authenticated key exchange method of claim 1, wherein the generated key is generated by applying a one-way Hash function to an identifier of the subscriber station and the public key of the authentication server in (b).

6. The two-factor authenticated key exchange method of claim 1, wherein (d) comprises:
applying a Hash function to the received random number, the password, and the key stored in the token, and generating a second predetermined value;
using the second predetermined value and encrypting the first predetermined value;
using the random number and the first predetermined value, and generating the subscriber's session key;
applying the Hash function to the generated session key, the password, the key stored in the token, and the identifier of the subscriber station, and generating the subscriber's authenticator; and
transmitting the encrypted first predetermined value and the subscriber's authenticator to the authentication server.

7. The two-factor authenticated key exchange method of claim 6, wherein (f) comprises:
applying the Hash function to the subscriber's session key, the password, the key stored in the token, and the public key of the authentication server, and generating a third predetermined value;
determining whether the generated third predetermined value corresponds to the authenticator of the authentication server received from the authentication server; and
determining that the authentication between the subscriber station and the authentication server is successful and receiving the authenticator of the authentication server when the generated third predetermined value is found to correspond to the authenticator of the authentication server.

8. The two-factor authenticated key exchange method of claim 1, wherein the subscriber station transmits a user name, a hashed value of the public key of the authentication server, and a domain name to the authentication server when the identifier of the subscriber station uses the NAI (network access ID) format in order to support global roaming and billing in (a).

9. In a mutual authentication method through a two-factor authenticated key exchange between a subscriber station and an authentication server in a wireless communication system in which the subscriber station and the authentication server are accessed through an access point, an authentication method through a two-factor authenticated key exchange comprising:
(a) the subscriber station during an idle time at which the subscriber station is not connected to the authentication server and before a protocol for authentication with the authentication server is performed generating a random number and precomputing a first predetermined value to use for authentication with the authentication server;
(b) the subscriber station receiving an identifier request from the access point;
(c) the subscriber station transmitting a key generated by using an identifier of the subscriber station and a public key of the authentication server to the authentication server through the access point;
(d) the authentication server using the key received from the subscriber station, detecting a subscriber's password, a secret key, and the public key of the authentication server, generating a random number, and transmitting the random number to the subscriber station through the access point;
(e) the subscriber station using the received random number, the subscriber's password, and a key stored in a token, encrypting the first predetermined value, and transmitting the encrypted first predetermined value and a generated authenticator of the subscriber to the authentication server through the access point;
(f) the authentication server establishing a second predetermined value generated by using the subscriber's password, the key stored in the token, and the random number to be a secret key, decrypting the encrypted first predetermined value received in (e), authenticating the received authenticator of the subscriber based on the decrypted first predetermined value, and when the authentication is found successful, transmitting an authenticator of the authentication server generated by using the subscriber's password, the key stored in the token, and the public key to the subscriber station through the access point;
(g) the subscriber station using the key stored in the token and the subscriber's password, authenticating the received authenticator of the authentication server, and transmitting an authentication result to the authentication server through the access point; and
(h) the authentication server transmitting an access permission for the subscriber to the subscriber station through the access point when the authentication result transmitted from the subscriber station is found successful,
wherein the authenticator of the authentication server is generated by the authentication server using the encrypted first predetermined value transmitted from the subscriber station.

10. The authentication method of claim 9, wherein the key stored in the token is a symmetric key.

11. The authentication method of claim 9, wherein an extensible authentication protocol is used between the subscriber station and the access point, and
a RADIUS protocol is used between the access point and the authentication server.

12. A non-transitory computer readable recording medium recording a program for realizing a method for exchanging keys for mutual authentication at a subscriber station accessed to an authentication server through a wired/wireless communication, the non-transitory computer readable recording medium storing a program, to implement the method comprising:
(a) the subscriber station during an idle time at which the subscriber station is not connected to the authentication server before a protocol for authentication with the authentication server is performed generating a random number and precomputing a first predetermined value to use for authentication with the authentication server;

(b) the subscriber station transmitting a key generated by using an identifier of the subscriber station and a public key of the authentication server to the authentication server;

(c) the subscriber station receiving a random number generated by the authentication server;

(d) the subscriber station using the received random number, a password predefined at the subscriber station, and a key stored in a token, encrypting the first predetermined value, and transmitting the encrypted first predetermined value and a generated authenticator of the subscriber to the authentication server;

(e) the subscriber station receiving an authentication server's authenticator from the authentication server, wherein the authentication server authenticates the generated authenticator of the subscriber using the encrypted first predetermined value and generates the authentication server's authenticator when the authentication is successful; and (f) the subscriber station using the key stored in the token and the password, authenticating the received authentication server's authenticator, and accepting the authentication server's authenticator when the authentication is successful, wherein the authentication server's authenticator is generated by the authentication server using the encrypted first predetermined value transmitted from the subscriber station, and wherein the subscriber station authenticates the authentication server's authenticator using the first predetermined value.

13. The recording medium of claim 12, wherein the key stored in the token is a symmetric key.

\* \* \* \* \*